United States Patent [19]
Miyake et al.

[11] Patent Number: 5,648,028
[45] Date of Patent: Jul. 15, 1997

[54] METHOD OF MANUFACTURING A SINTERED COMPOSITE BODY OF SILICON NITRIDE AND SILICON CARBIDE

[75] Inventors: Kazumi Miyake; Kagehisa Hamazaki; Hitoshi Toyoda; Yoshikatsu Higuchi, all of Saitama-ken, Japan

[73] Assignee: Honda Giken Kogyo Kabushiki Kaisha, Tokyo, Japan

[21] Appl. No.: 413,445

[22] Filed: Mar. 30, 1995

[30] Foreign Application Priority Data

Mar. 30, 1994 [JP] Japan ................... 6-084162
Nov. 29, 1994 [JP] Japan ................... 6-319037

[51] Int. Cl.$^6$ ..................... B28B 3/00; C04B 33/32
[52] U.S. Cl. ................ 264/647; 264/122; 264/125; 423/345
[58] Field of Search .................. 264/60, 65, 66, 264/122, 125; 501/92; 423/345, 346

[56] References Cited

U.S. PATENT DOCUMENTS

| | | | |
|---|---|---|---|
| 4,690,790 | 9/1987 | Bates | 264/63 |
| 4,800,182 | 1/1989 | Izaki et al. | 501/92 |
| 5,134,097 | 7/1992 | Niihara et al. | 501/92 |
| 5,523,267 | 6/1996 | Tanaka et al. | 501/92 |
| 5,538,675 | 7/1996 | Dunmead et al. | 264/29.7 |
| 5,541,143 | 7/1996 | Hirosaki et al. | 501/92 |

FOREIGN PATENT DOCUMENTS 2-160669  6/1990  Japan.
3-261611  11/1991  Japan.

*Primary Examiner*—Christopher A. Fiorilla
*Attorney, Agent, or Firm*—Birch, Stewart, Kolasch & Birch, LLP

[57] ABSTRACT

A sintered composite body of silicon nitride and silicon carbide is manufactured by mixing a silicon powder with a carbonaceous powder and a sintering additive, producing a mixture, molding the mixture into a molded body, heat-treating the molded body in an atmosphere containing a nitrogen gas for thereby simultaneously nitriding and carbonizing silicon contained in the molded body, and subsequently firing the molded body in a nitrogen gas atmosphere. A composite powder of silicon nitride and silicon carbide which is produced by simultaneously nitriding and carbonizing silicon contained in the molded body has a content of α-type silicon nitride which is at least 30% of all silicon nitride in the composite powder. To produce such a composite powder, a silicon powder is mixed with a carbonaceous powder and a sintering additive, producing a mixture, and the mixture is heat-treated in an atmosphere containing a nitrogen gas at a temperature of at most 1450° C. for thereby simultaneously nitriding and carbonizing silicon contained in the mixture, the arrangement being such that the temperature of the mixture is increased at a rate lower than 2° C./minute from a temperature before the silicon starts being nitrided and carbonized up to the temperature of at most 1450° C.

6 Claims, 2 Drawing Sheets

FIG. 4 though various compounds are added to their materials with a view to improving the mechanical strength of the sintered ceramic bodies, silicon carbide is one of the most promising ceramic compounds for making the sintered ceramic bodies highly resistant to acids, strong at high temperatures, and mechanically strong. Therefore, there have been proposed sintered ceramic bodies with silicon carbide added to silicon nitride. However, those sintered ceramic bodies which are composed of a simple mixture of powders of silicon nitride and silicon carbide do not have a nanocomposite structure, but is of such a structure in which the powder of silicon carbide with its particles having sizes on the order of microns exist only in the grain boundary of silicon nitride. There have been proposed various processes for producing sintered ceramic bodies having a nanocomposite structure in which particles of silicon carbide are finely dispersed in particles of silicon nitride.

METHOD OF MANUFACTURING A SINTERED COMPOSITE BODY OF SILICON NITRIDE AND SILICON CARBIDE

BACKGROUND OF THE INVENTION

1. Field of the Invention

The present invention relates to a composite powder of silicon nitride and silicon carbide, a method of manufacturing such a composite powder, and a method of manufacturing a sintered composite body of silicon nitride and silicon carbide which has a nanocomposite structure.

2. Description of the Prior Art

Sintered ceramic bodies of silicon nitride are expected to find applications for use as structural ceramics under severe conditions at high temperatures because of their high strength, high heat resistance, high thermal shock resistance, high wear resistance, and high acid resistance. While various compounds are added to their materials with a view to improving the mechanical strength of the sintered ceramic bodies, silicon carbide is one of the most promising ceramic compounds for making the sintered ceramic bodies highly resistant to acids, strong at high temperatures, and mechanically strong. Therefore, there have been proposed sintered ceramic bodies with silicon carbide added to silicon nitride. However, those sintered ceramic bodies which are composed of a simple mixture of powders of silicon nitride and silicon carbide do not have a nanocomposite structure, but is of such a structure in which the powder of silicon carbide with its particles having sizes on the order of microns exist only in the grain boundary of silicon nitride. There have been proposed various processes for producing sintered ceramic bodies having a nanocomposite structure in which particles of silicon carbide are finely dispersed in particles of silicon nitride.

Japanese laid-open patent publication No. 2-160669 discloses a sintered composite body of silicon nitride and silicon carbide which has a microstructure wherein particles of silicon carbide having an average diameter of 1 μm or less are dispersed in the grain boundary and fine particles of silicon carbide having sizes ranging from several nanometers to several hundred nanometers are dispersed in particles of silicon nitride. The disclosed sintered composite body is produced by firing, at a temperature ranging from 1500° to 2300° C. in the presence of a sintering additive, a composite powder of amorphous silicon nitride and silicon carbide or a mixed powder of silicon nitride and silicon carbide which produces fine particles of silicon nitride having an average diameter of 0.5 μm or less in a liquid phase sintering system. However, the composite powder of amorphous silicon nitride and silicon carbide, which is produced by a vapor phase reaction of an organic silicon compound, is highly costly to manufacture and cannot efficiently be mass-produced. Another problem is that the amorphous powder has poor moldability. The mixed powder of silicon nitride and silicon carbide which is specifically disclosed is a mixture of a composite powder of amorphous silicon nitride and silicon carbide and a powder of silicon carbide, and hence suffers the same problems as the composite powder of amorphous silicon nitride and silicon carbide.

Japanese laid-open patent publication No. 3-261611 discloses a process of manufacturing a composite powder of silicon nitride to be used in the manufacture of a sintered composite body of silicon nitride and silicon carbide. According to the disclosed process, a metal powder of silicon (Si) and a carbonaceous powder are mixed with each other, and the mixture is heated in an inert gas atmosphere containing nitrogen at a temperature of 1400° C. or less for thereby simultaneously effecting carbonizing and nitriding reactions of the metal powder of silicon. However, since the composite powder contains no sintering additive, β-type silicon nitride tends to separate out of the composite powder, making it difficult to increase the content of α-type silicon nitride in the composite powder. The disclosed process is also problematic in that the produced powder has large particle diameters and hence poor sinterability because the composite powder undergoes grain growth during the reactions.

SUMMARY OF THE INVENTION

It is therefore an object of the present invention to provide a composite powder of silicon nitride and silicon carbide to be used for the manufacture of a sintered body which has good sinterability and high strength.

Another object of the present invention is to provide a method of manufacturing such a composite powder of silicon nitride and silicon carbide.

Still another object of the present invention is to provide a method of inexpensively manufacturing a sintered composite body of silicon nitride and silicon carbide, which has good high-temperature strength, static fatigue resistance, wear resistance, and hardness.

According to the present invention, there is provided a method of manufacturing a sintered composite body of silicon nitride and silicon carbide, comprising the steps of mixing a silicon powder with a carbonaceous powder and a sintering additive, producing a mixture, molding the mixture into a molded body, heat-treating the molded body in an atmosphere containing a nitrogen gas for thereby simultaneously nitriding and carbonizing silicon contained in the molded body, and subsequently firing the molded body in a nitrogen gas atmosphere.

The molded body may be heat-treated at a temperature of at most 1450° C., preferably at a temperature ranging from 1350° to 1400° C.

The molded body may be fired at a temperature ranging from 1700° C. to 2200° C., preferably at a temperature ranging from 1800° C. to 2000° C.

According to the present invention, there is also provided a composite powder of silicon nitride and silicon carbide produced by mixing a silicon powder with a carbonaceous powder and a sintering additive, producing a mixture, molding the mixture into a molded body, and heat-treating the molded body in an atmosphere containing a nitrogen gas for thereby simultaneously nitriding and carbonizing silicon contained in the molded body, the composite powder having a content of α-type silicon nitride which is at least 30% of all silicon nitride in the composite powder.

The content of α-type silicon nitride may be at least 40% of all silicon nitride in the composite powder.

The sintering additive may comprise either at least one compound selected from the group consisting of an oxide, a nitride, and a carbide of elements in Group 3A and Group 4A of the Periodic Table, or both the at least one compound and aluminum nitride. The at least one compound may comprise yttrium oxide.

According to the present invention, there is further provided a method of manufacturing a composite powder of silicon nitride and silicon carbide which has a content of α-type silicon nitride which is at least 30% of all silicon nitride in the composite powder, comprising the steps of mixing a silicon powder with a carbonaceous powder and a sintering additive, producing a mixture, and heat-treating the mixture in an atmosphere containing a nitrogen gas at a temperature of at most 1450° C. for thereby simultaneously nitriding and carbonizing silicon contained in the mixture, the arrangement being such that the temperature of the mixture is increased at a rate lower than 2° C./minute from a temperature before the silicon starts being nitrided and carbonized up to the temperature of at most 1450° C.

The mixture may be heat-treated at a temperature ranging from 1350° to 1400° C.

According to the present invention, there is also provided a method of manufacturing a sintered composite body of silicon nitride and silicon carbide, comprising the step of firing a composite powder of silicon nitride and silicon carbide according to claim 6 by way of hot isostatic pressing or hot pressing.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A method of manufacturing a sintered composite body of silicon nitride and silicon carbide according to a first embodiment of the present invention will be described below.

1 Starting materials

(a) Silicon powder

A silicon powder used in the present invention should have an average particle diameter which ranges preferably from 0.2 to 0.9 μm, more preferably from 0.3 to 0.6 μm. If the average particle diameter were smaller than 0.2 μm, then the surfaces of the powder particles would be oxidized excessively. If the average particle diameter were greater than 0.9 μm, then it would be difficult for the silicon powder to be dispersed uniformly. The distribution of particle diameters should lie preferably within a range of from 0.1 to 9 μm, and more preferably within a range of 0.1 to 4 μm.

The content of the silicon powder in the starting materials should range preferably from 58.9 to 88% by weight, and more preferably from 66.4 to 77.6% by weight. If the content of the silicon powder were smaller than 58.9% by weight, then the reaction sintering of silicon (Si) would not be sufficient, and no desired composite powder would be produced. If the content of the silicon powder were greater than 88% by weight, then the density of a resulting sintered body would not be high enough.

(b) Carbonaceous powder

A carbonaceous powder used in the present invention is not limited to any particular carbonaceous powder insofar as it is fine. However, the carbonaceous powder should preferably a graphite powder or a carbon black powder such as acetylene black, ketjen black, etc. The carbonaceous powder should have an average particle diameter of 0.9 μm or smaller, preferably of 0.6 μm or smaller. If the average particle diameter were greater than 0.9 μm, then it would be difficult for the carbonaceous powder to be dispersed uniformly.

The content of the carbonaceous powder in the starting materials should range preferably from 7.0 to 13.5% by weight, and more preferably from 10.4 to 12.0% by weight. If the content of the carbonaceous powder were smaller than 7.0% by weight, then no desired composite effect would be obtained. If the content of the carbonaceous powder were greater than 13.5% by weight, then the density of a resulting sintered body would not be high enough.

(c) Silicon nitride ($Si_3N_4$) powder

In order to improve the moldability of a silicon powder mixture, a powder of silicon nitride ($Si_3N_4$) having an average particle diameter ranging from 0.1 to 1 μm, preferably from 0.1 to 0.5 μm, may be added. The amount of the added silicon nitride powder should range preferably from 0 to 5% by weight, more preferably from 3.5 to 4.5% by weight, with respect to 100% by weight of the starting materials. If the amount of the added silicon nitride powder were too large, i.e., if the proportion of the added silicon nitride powder with respect to the silicon powder were too high, then the reaction sintering of silicon would not be sufficient.

(d) Silicon carbide powder

In order to improve the moldability of a silicon powder mixture, a powder of silicon carbide may be added in a small amount. The amount of the added silicon carbide powder should range preferably from 0 to 2.5% by weight, more preferably from 1.5 to 2.1% by weight, with respect to 100% by weight of the starting materials. If the amount of the added silicon carbide powder were greater than 2.5% by weight, then the reaction sintering of silicon would not be sufficient.

(e) Sintering additive powder

A sintering additive powder is added which comprises at least one compound selected from the group consisting of yttrium oxide ($Y_2O_3$), aluminum oxide ($Al_2O_3$), magnesium oxide (MgO), ytterbium oxide ($Yb_2O_3$), hafnium oxide ($HfO_2$), aluminum nitride (AlN), lanthanum oxide ($La_2O_3$), zirconium oxide ($ZrO_2$), iron (Fe), iron oxide ($Fe_2O_3$), and an element in Group 3A of the Periodic Table. Particularly preferable is yttrium oxide or a combination of yttrium oxide and at least one of the above sintering additive powders.

The content of the added sintering additive powder should range preferably from 5 to 20% by weight, more preferably from 7 to 15% by weight, with respect to 100% by weight of the starting materials. If the content of the added sintering additive powder were smaller than 5% by weight, then the sinterability of a resulting composite powder would be insufficient. If the content of the added sintering additive powder were greater than 20% by weight, then the high-temperature strength of a resulting sintered body would be low.

2 Process of manufacturing a sintered composite body (1) Production of a molded body The above starting materials are prepared at the above ratios, and sufficiently mixed by a ball mill, a kneader, or the like. The materials may be mixed in a dry or wet mixing process. If the materials are mixed in a wet mixing process, then a dispersing medium such as water, ethanol, butanol, or the like is added to the powdery mixture. If the mixture is to be molded by injection molding, then a suitable organic or inorganic binder is added. A suitable organic binder may comprise, for example, ethyl silicate, polyethylene glycol, polyvinyl alcohol (PVA), acrylic emulsion, polyurethane emulsion, or the like.

If the mixture is to be molded into a molded body of complex shape, then it should preferably be molded by slip casting or injection molding.

(2) Nitriding/carbonization

Then, the molded body is heated in a nitrogen-containing atmosphere to simultaneously nitride and carbonize the silicon powder in the molded body. The nitriding and carbonizing rates are determined depending on the amount of added carbon in the starting materials. Specifically, since substantially all carbon is bonded with silicon, producing silicon carbide, unreacted silicon is transformed substantially entirely into silicon nitride. If silicon and carbon are mixed at a molar ratio of 100:7, then the molar ratio of silicon nitride and silicon carbide is 31:7.

Conditions for nitriding and carbonizing the silicon powder in the molded body need to be altered depending on the thickness or the like of the molded body. However, the molded body should be heated to a temperature of 1450° C. or below. If the molded body were heated to a temperature in excess of 1450° C., then silicon would undesirably be eluted or evaporated. It is preferable to set the lower limit of nitriding and carbonizing temperatures to 1300° C.. If the lower limit of nitriding and carbonizing temperatures were less than 1300° C., then no nitriding and carbonizing reactions would take place, or the rate of nitriding and carbonizing reactions, if any, would be too low. The preferable range of temperatures of nitriding and carbonizing reactions is from 1350° to 1400° C.

The pressure of the nitrogen-containing atmosphere should preferably be 1 kgf/cm², or more preferably range from 5 to 2000 kgf/cm². If the pressure of the nitrogen-containing atmosphere were lower than 1 kgf/cm², then the nitriding would not progress well. Preferably, the nitriding and carbonizing reactions should take place for a period of time preferably in the range of from 1 to 10 hours, though the period of time may vary more or less depending on the reaction temperature.

When the nitriding process is carried out under the above conditions, the silicon particles in the mixture are nitrided to generate silicon nitride which contains a high proportion of α-type silicon nitride and also generate fine particles of silicon carbide through a reaction with carbon. Inasmuch as silicon carbide is generated by a reaction between silicon and carbon, silicon carbide exists not only in the ground boundary of silicon nitride, but also in the particles of silicon nitride.

(3) Firing

The molded body which has been nitrided is then fired at a temperature ranging from 1700° to 2200° C., preferably from 1800° to 2000° C. If the temperature were lower than 1700° C., then the strength and tenacity of a resulting sintered body would be low. If the temperature were higher than 2200° C., then the silicon nitride would undesirably start being decomposed. The molded body is fired in a non-oxidizing atmosphere, preferably in a nitrogen-gas atmosphere, which should preferably have a gas pressure ranging from 5 to 2000 kgf/cm². The temperature at which the molded body is fired should be maintained for a period of time preferably in the range of from 1 to 5 hours. To achieve a good sintered body density, the molded body should be fired preferably while pressurized by hot isostatic pressing (HIP) or hot pressing (HP).

3; Sintered composite body of silicon nitride and silicon carbide

A sintered composite body of silicon nitride and silicon carbide thus produced has a so-called nanocomposite structure wherein fine particles of silicon carbide are dispersed in particles of silicon nitride. Since the particles of silicon carbide have a larger coefficient of thermal expansion than the particles of silicon nitride, it is considered that compressive residual stresses are exerted to the particles of silicon nitride. The fine particles of silicon carbide dispersed in the particles of silicon nitride are believed to act as a wedge to inhibit a grain boundary slip of silicon nitride.

Therefore, if the ratio of silicon carbide to silicon nitride were too small, then the above effects would not be sufficiently obtained. If the ratio of silicon carbide to silicon nitride were too large, then the dispersed particles of silicon carbide would be too many, suppressing the grain growth of silicon nitride and hence preventing the density of the sintered body from being sufficiently increased. For these reasons, the weight ratio of silicon carbide to silicon nitride should range preferably from 20/80 to 40/60, and more preferably from 30/70 to 35/65.

EXAMPLES

The first embodiment of the present invention will be described in greater detail below with reference to Inventive and Comparative Examples. However, the first embodiment should not be interpreted as being limited to Inventive Examples given below.

Inventive Example 1

71.7% by weight of a silicon powder having an average particle diameter of 0.5 µm, 11.9% by weight of a carbon black powder having an average particle diameter of 0.2 µm, 3.9% by weight of a silicon nitride powder having an average particle diameter of 0.1 µm, 2.1% by weight of a silicon carbide powder having an average particle diameter of 0.2 µm, and 10.4% by weight of an yttrium oxide powder having an average particle diameter of 1.4 µm were weighed such that they would have a total weight of 300 g when the reaction would progress 100%, and mixed for 18 hours by a ball mill using a solvent of ethanol. The mixture was then dried.

Figure 1:
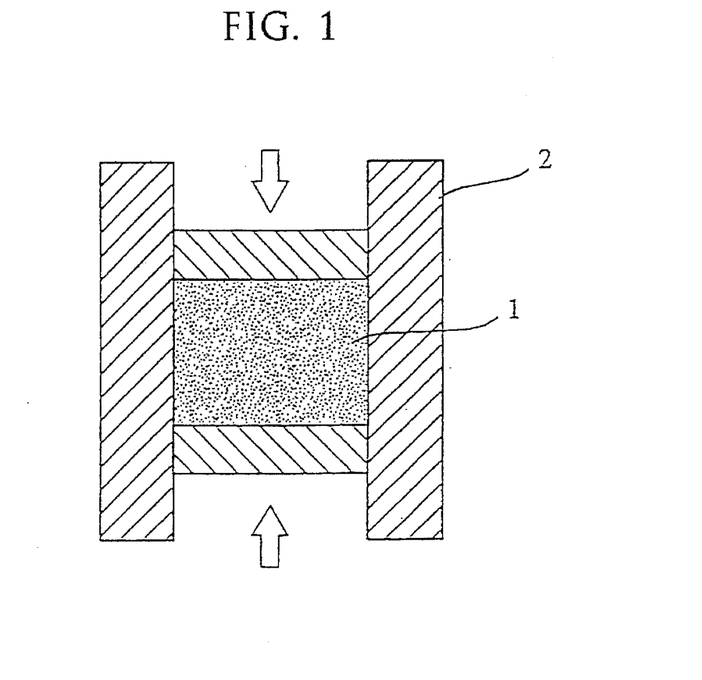
FIG. 1 is a schematic cross-sectional view of a hot-pressing graphite die assembly for producing a molded body from which a sintered composite body is to be manufactured.
Figure 2:
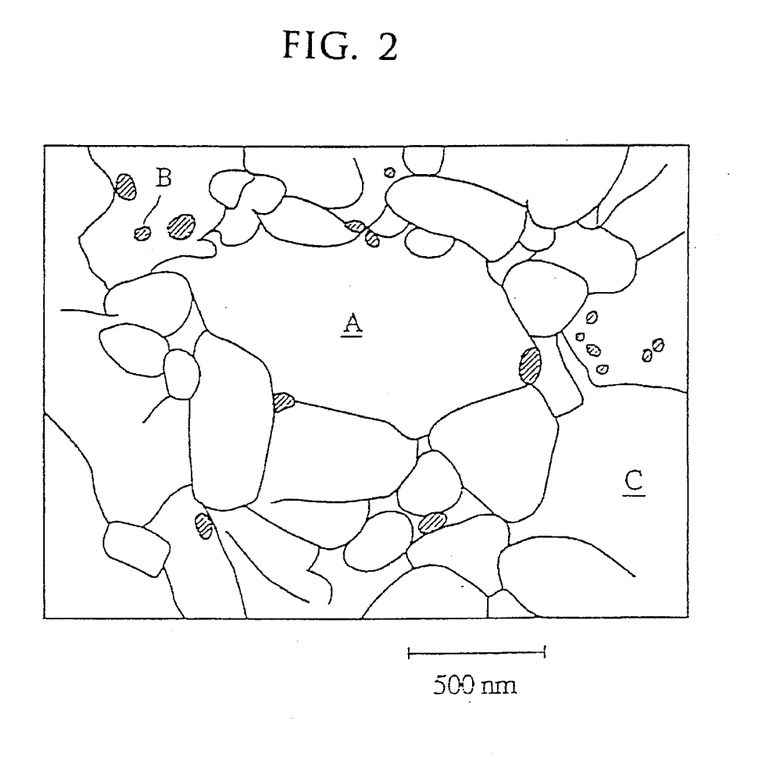
FIG. 2 is a schematic diagram showing a structural representation of a sintered composite body produced according to Inventive Example 1.

As shown in FIG. 1, the material powder thus obtained, denoted at 1, was filled in a hot-pressing graphite die assembly 2 having a diameter of 50 mm, and kept at a temperature of 1400° C. for four hours in a nitrogen gas atmosphere under nine atmospheric pressures to cause nitriding and carbonizing reactions. Then, the temperature was increased up to a maximum level of 1800° C. under a load to 5 t in the same nitrogen gas atmosphere thereby to fire the material powder for four hours by way of hot pressing, thereby obtaining a sintered body. A microscopic observation of the structure of the sintered body indicated that the sintered body had a nanocomposite structure as schematically shown in FIG. 2. In FIG. 2, the reference character "A" represents a silicon nitride particle, "B" a silicon carbide particle, and "C" a phase composed of silicon, yttrium, and oxygen. The properties of the sintered body are given as follows:

Sintered body density: 3.3 g/cm$^3$

Silicon carbide content*: 35% by weight

Hardness (Hv)**: 2197 Kg/mm$^2$

*: Calculated from the results of a quantitative analysis of the elements of silicon, carbon, and nitrogen contained in the sintered body [SiC/SiC+Si$_3$N$_4$)]×100%.

**: The surface of the sample was ground with diamond, and measured for hardness by a Vickers hardness test machine at 500 g×10 seconds.

The sintered body was cut off into a test piece having a size of 3 mm×4 mm×40 mm, and the test piece was subjected to a three-point bending strength test (at a room temperature and 1400° C.) and a static fatigue test under the following conditions:

(1) The three-point bending strength test: At a room temperature, the test was conducted with a span of 30 mm at a crosshead speed of 0.5 mm/minute. For the test at 1400° C., the temperature of the test piece was increased to 1400° C. and kept at 1400° C. for one hour, after which the test was conducted under the above conditions.

(2) The static fatigue test: After the temperature of the test piece was increased to 1300° C. with a span of 30 mm, the temperature was kept at 1300° C., and a predetermined load was applied to the test. The time that elapsed until the test piece was ruptured under the load was measured to determined a static fatigue.

The results of the three-point bending strength test and the static fatigue test are as follows:

The three-point bending strength test:
Room temperature: 580 MPa
1400° C.: 591 MPa The static fatigue test (1300° C., predicted strength after 10000 hours): 353 MPa Inventive Examples 2, 3 and Comparative Example 1

A silicon powder having an average particle diameter of 0.5 μm, a carbon black powder having an average particle diameter of 0.2 μm, a silicon nitride powder having an average particle diameter of 0.1 μm, a silicon carbide powder having an average particle diameter of 0.2 μm, an yttrium oxide powder having an average particle diameter of 1.4 μm, and an aluminum nitride powder having an average particle diameter of 2 μm were weighed at proportions shown in Table 1 below such that they would have a total weight of 300 g when the reaction would progress 100%, and mixed for 18 hours by a ball mill using a solvent of ethanol. The mixture was then dried. The material powder thus obtained was sintered by hot pressing under the same conditions as with Inventive Example 1, and evaluated for its properties. The results are also given in Table 1.

TABLE 1

| Powder Composition (wt. %) | In. Ex. 2 | In. Ex. 3 | Co. Ex. 1 |
|---|---|---|---|
| Si powder | 72.9 | 69.9 | 80.6 |
| Carbon black powder | 10.4 | 11.3 | — |
| Si$_3$N$_4$ powder | 4.3 | 3.9 | 7.1 |
| SiC powder | 1.8 | 2.0 | — |
| Y$_2$O$_3$ powder | 10.6 | 9.0 | 12.3 |
| AlN powder | — | 3.9 | — |
| Properties | | | |
| 3-point bending Room temp. | 570 | 328 | — |
| test (MPa) 1400° C. | 584 | 252 | — |
| Predicted strength (MPa) after 10000 hours[1] | 348 | 177 | — |
| Sintered body density (g/cm$^3$) | 3.2 | 3.2 | 3.0 |
| SiC content (wt. %)[2] | 30 | 34 | 0 |
| Hardness (Hv)[3] | 2012 | | 1062 |

[1]Calculated in the same manner as with Inventive Example 1.
[2]Calculated in the same manner as with Inventive Example 1.
[3]Measured in the same manner as with Inventive Example 1.

Comparative Examples 2, 3

A silicon nitride powder having an average particle diameter of 1.2 μm (direct nitriding, α/α+β=92%), a silicon carbide powder having an average particle diameter of 1.2 μm, and an yttrium oxide powder having an average particle diameter of 1.4 μm were weighed at proportions shown in Table 2 below (their total weight was 300 g), and mixed for 18 hours by a ball mill using a solvent of ethanol. The mixture was then dried. The material powder thus obtained was filled in a graphite die assembly having a diameter of 50 mm as shown in FIG. 1, and sintered by hot pressing under a load of 5 t at a maximum temperature of 1800° C. in a nitrogen gas for four hours. The sintered body was evaluated for its properties in the same manner as with Inventive Example 1. The results are also given in Table 2.

TABLE 2

| Powder Composition (wt. %) | Co. Ex. 2 | Co. Ex. 3 |
|---|---|---|
| Si$_3$N$_4$ powder | 92.0 | 64.4 |
| SiC powder | — | 27.6 |
| Y$_2$O$_3$ powder | 8.0 | 8.0 |
| Properties | | |
| 3-point bending Room temp. | 775 | 408 |
| test (MPa) 1400° C. | 139 | 123 |
| Predicted strength (MPa) after 10000 hours[1] | 49 | 31 |
| Sintered body density (g/cm$^3$) | 3.2 | 3.0 |
| SiC content (wt. %)[2] | 0 | 30 |
| Hardness (Hv)[3] | 1698 | 1194 |

[1]Calculated in the same manner as with Inventive Example 1.
[2]Calculated in the same manner as with Inventive Example 1.
[3]Measured in the same manner as with Inventive Example 1.

As can be seen from Table 2, the sintered bodies according to Comparative Examples 2 and 3, which were not sintered bodies produced by the reactive sintering of a silicon powder, had no sufficient mechanical strength and heat resistance for they had no nanocomposite structure wherein fine particles of silicon carbide exist in particles of silicon nitride.

As described above, according to the first embodiment, since a mixture of powders containing silicon and carbon is used as starting materials, and silicon is simultaneously nitrided and carbonized by heat treatment in an atmosphere containing a nitrogen gas, a resulting sintered composite body has a nanocomposite structure wherein fine particles of silicon carbide are dispersed in particles of silicon nitride. Therefore, the sintered composite body has excellent high-temperature strength, static fatigue resistance, wear resistance, and hardness. The sintered composite body of silicon nitride and silicon carbide is suitable for use as a sliding member or the like that is used at high temperatures.

A composite powder of silicon nitride and silicon carbide, a method of manufacturing such a composite powder, and a method of manufacturing a sintered composite body of silicon nitride and silicon carbide according to a second embodiment of the present invention will be described below.

1 Starting materials (a) Silicon powder

A silicon powder used in the present invention should have an average particle diameter which ranges preferably from 0.2 to 10 µm, more preferably from 0.3 to 5 µm. If the average particle diameter were smaller than 0.2 µm, then the surfaces of the powder particles would be oxidized excessively. If the average particle diameter were greater than 10 µm, then it would be difficult for the silicon powder to be dispersed uniformly.

The content of the silicon powder in the starting materials should range preferably from 58.9 to 88% by weight, and more preferably from 66.4 to 77.6% by weight. If the content of the silicon powder were smaller than 58.9% by weight, then the reaction sintering of silicon (Si) would not be sufficient, and no desired composite powder would be produced. If the content of the silicon powder were greater than 88% by weight, then the density of a resulting sintered body would not be high enough.

(b) Carbonaceous powder

A carbonaceous powder used in the present invention is not limited to any particular carbonaceous powder insofar as it is fine. The carbonaceous powder should have an average particle diameter of 10 µm or smaller, preferably of 5 µm or smaller. If the average particle diameter were greater than 10 µm, then it would be difficult for the carbonaceous powder to be dispersed uniformly.

The content of the carbonaceous powder in the starting materials should range preferably from 7.0 to 13.5% by weight, and more preferably from 10.4 to 12.0% by weight. If the content of the carbonaceous powder were smaller than 7.0% by weight, then no desired composite effect would be obtained. If the content of the carbonaceous powder were greater than 13.5% by weight, then the density of a resulting sintered body would not be high enough.

(c) Silicon nitride ($Si_3N_4$) powder

In order to produce nuclei (seed crystals) for generating silicon nitride by way of a nitriding reaction of silicon, a powder of silicon nitride ($Si_3N_4$) having an average particle diameter ranging from 0.1 to 1 µm, preferably from 0.1 to 0.5 µm, may be added. The amount of the added silicon nitride powder should range preferably from 0 to 5% by weight, more preferably from 3.5 to 4.5% by weight, with respect to 100% by weight of the starting materials. If the amount of the added silicon nitride powder were too large, i.e., if the proportion of the added silicon nitride powder with respect to the silicon powder were too high, then the reaction sintering of silicon would not be sufficient.

(d) Silicon carbide powder

In order to produce nuclei (seed crystals) for generating silicon nitride by way of a nitriding reaction of silicon, a powder of silicon carbide may be added in a small amount. The amount of the added silicon carbide powder should range preferably from 0 to 2.5% by weight, more preferably from 1.5 to 2.1% by weight, with respect to 100% by weight of the starting materials. If the amount of the added silicon carbide powder were greater than 2.5% by weight, then the reaction sintering of silicon would not be sufficient.

(e) Sintering additive powder

A sintering additive powder is added which comprises either a) at least one compound selected from the group consisting of an oxide, a nitride, and a carbide of elements in Group 3A and Group 4A of the Periodic Table, or both a) such at least one compound and b) aluminum nitride (AlN). Preferably, a sintering additive powder should comprise a) at least one compound selected from the group consisting of yttrium oxide ($Y_2O_3$), lanthanum oxide ($La_2O_3$), ytterbium oxide ($Yb_2O_3$), and hafnium oxide ($HfO_2$), or both a) such at least one compound and b) aluminum nitride. Particularly preferable is yttrium oxide alone or both yttrium oxide and aluminum nitride.

The content of the added sintering additive powder should range preferably from 5 to 20% by weight, more preferably from 7 to 15% by weight, with respect to 100% by weight of the starting materials. If the content of the added sintering additive powder were smaller than 5% by weight, then the sinterability of a resulting composite powder would be insufficient. If the content of the added sintering additive powder were greater than 20% by weight, then the high-temperature strength of a resulting sintered body would be low.

The sintering additive is mixed with the silicon powder and the carbonaceous powder, and nitrided and carbonized. By adding the sintering additive from the beginning of the process, the content of α-type silicon nitride in the composite powder is increased, and the sintering additive is dispersed well, thereby increasing the strength of the sintered body.

2 Process of manufacturing a composite powder (1) Production of a mixed powder

The above starting materials are prepared at the above ratios, and sufficiently mixed by a ball mill, a kneader, or the like. The materials may be mixed in a dry or wet mixing process. If the materials are mixed in a wet mixing process, then a dispersing medium such as water, ethanol, butanol, or the like is added to the powdery mixture. A suitable organic or inorganic binder may be added. A suitable organic binder may comprise, for example, ethyl silicate, polyethylene glycol, polyvinyl alcohol (PVA), acrylic emulsion, polyurethane emulsion, or the like.

(2) Nitriding/carbonization

Then, the mixture is heated in a nitrogen-containing atmosphere to simultaneously nitride and carbonize the silicon powder in the mixture. The nitriding and carbonizing rates are determined depending on the amount of added carbon in the starting materials. Specifically, since substantially all carbon is bonded with silicon, producing silicon carbide, unreacted silicon is transformed substantially entirely into silicon nitride. If silicon and carbon are mixed at a molar ratio of 100:7, then the molar ratio of silicon nitride and silicon carbide is 31:7.

Conditions for nitriding and carbonizing the silicon powder in the mixture need to be altered depending on the composition or the like of the mixture. However, the mixture should be heated to a temperature of 1450° C. or below. If the mixture were heated to a temperature in excess of 1450° C., then silicon would undesirably be eluted or evaporated. It is preferable to set the lower limit of nitriding and carbonizing temperatures to 1200° C. If the lower limit of nitriding and carbonizing temperatures were less than 1200° C., then no nitriding and carbonizing reactions would take place, or the rate of nitriding and carbonizing reactions, if any, would be too low. The preferable range of temperatures of nitriding and carbonizing reactions is from 1230° to 1400° C.

The rate at which the temperature increases is reduced in the vicinity of the temperature of the nitriding reaction (reaction maintaining temperature). Specifically, when the temperature of the atmosphere is in the range of from 1100° to 1300° C. or higher, then the rate at which the temperature increases is lower than 2° C./minute, preferably 0.5° C./minute or lower. If the rate were 2° C./minute or higher, then the nitriding reaction would undesirably become violent, reducing the content of α-type silicon nitride in a produced composite powder thereby to lower the sinterability of the composite powder. The content of α-type silicon nitride in the produced composite powder is preferably 30% or higher, or more preferably 40% or higher, of all silicon nitride in the composite powder.

The pressure of the nitrogen-containing atmosphere should preferably be 1 kgf/cm$^2$, or more preferably range from 5 to 2000 kgf/cm$^2$. If the pressure of the nitrogen-containing atmosphere were lower than 1 kgf/cm$^2$, then nitriding would not progress well. Preferably, the nitriding and carbonizing reactions should take place for a period of time preferably in the range of from 1 to 10 hours, though the period of time may vary more or less depending on the reaction temperature.

(3) Grinding of the composite

The composite of silicon nitride and silicon carbide which has been produced by the nitriding and carbonizing process is ground into a composite powder by a ball mill, a jet mill, an attrition mill, or the like. The composite powder thus produced has an average particle diameter ranging from 0.1 to 5 μm, preferably from 0.3 to 3 μm.

3 Composite powder of silicon nitride and silicon carbide

When the nitriding process is carried out under the above conditions, the silicon particles in the mixture are nitrided to generate silicon nitride which contains a high proportion of α-type silicon nitride and also generate fine particles of silicon carbide through a reaction with carbon. Inasmuch as silicon carbide is generated by a reaction between silicon and carbon, silicon carbide exists not only in the ground boundary of silicon nitride, but also in the particles of silicon nitride.

4 Process of manufacturing a sintered composite body

(1) Production of a molded body

The above composite powder is molded in a known manner. If the composite powder is molded in a wet molding process, then a dispersing medium such as water, ethanol, butanol, or the like is added to the composite powder. If the composite powder is molded by injection molding, then a suitable organic or inorganic binder is added. A suitable organic binder may comprise, for example, ethyl silicate, polyethylene glycol, polyvinyl alcohol (PVA), acrylic emulsion, polyurethane emulsion, or the like.

If the composite powder is to be molded into a molded body of complex shape, then it should preferably be molded by slip casting or injection molding.

(2) Firing

The molded body is then fired at a temperature ranging from 1700° to 2200° C., preferably from 1800° to 2000° C. If the temperature were lower than 1700° C., then the strength and tenacity of a resulting sintered body would be low. If the temperature were higher than 2200° C., then the silicon nitride would undesirably start being decomposed. The molded body is fired in a non-oxidizing atmosphere, preferably in a nitrogen-gas atmosphere, which should preferably have a gas pressure ranging from 5 to 2000 kgf/cm$^2$. The temperature at which the molded body is fired should be maintained for a period of time preferably in the range of from 1 to 5 hours. To achieve a good sintered body density, the molded body should be fired preferably while pressurized by hot isostatic pressing (HIP) or hot pressing (HP).

(3) Sintered composite body of silicon nitride and silicon carbide

A sintered composite body of silicon nitride and silicon carbide thus produced has a so-called nanocomposite structure wherein fine particles of silicon carbide are dispersed in particles of silicon nitride. Since the particles of silicon carbide have a larger coefficient of thermal expansion than the particles of silicon nitride, it is considered that residual stresses are exerted to the particles of silicon nitride. The fine particles of silicon carbide dispersed in the particles of silicon nitride are believed to act as a wedge to inhibit a grain boundary slip of silicon nitride.

Therefore, if the ratio of silicon carbide to silicon nitride were too small, then the above effects would not be sufficiently obtained. If the ratio of silicon carbide to silicon nitride were too large, then the dispersed particles of silicon carbide would be too many, suppressing the grain growth of silicon nitride and hence preventing the density of the sintered body from being sufficiently increased. For these reasons, the weight ratio of silicon carbide to silicon nitride should range preferably from 20/80 to 40/60, and more preferably from 30/70 to 35/65.

EXAMPLES

The second embodiment of the present invention will be described in greater detail below with reference to Inventive and Comparative Examples. However, the second embodiment of the present invention should not be interpreted as being limited to Inventive Examples given below.

Inventive Example 4

(1) Production of composite powder

A silicon powder having an average particle diameter of 0.5 μm, a graphite powder, as a carbonaceous material, having an average particle diameter of 5 μm or less, a silicon nitride powder having an average particle diameter of 0.1 μm, a silicon carbide powder having an average particle diameter of 0.2 μm, an yttrium oxide powder having an average particle diameter of 1.4 μm, and an aluminum nitride powder having an average particle diameter of 2 μm were weighed at proportions shown in Table 3 below such that they would have a total weight of 500 g when the reaction would progress 100%, and mixed together with 80 parts by weight of balls for 18 hours by a ball mill using a solvent of 200 parts by weight of ethanol. The mixture was then dried.

The material powder thus obtained was then placed in a reaction container. After the temperature of the material powder was increased up to 1380° C. at a rate of 0.5° C./minute from 1300° C., the material powder was kept at 1380° C. for 60 minutes. Then, the material powder was nitrided and carbonized in a nitrogen gas atmosphere under a pressure of 9 kgf/cm$^2$, after which the material powder, 200 parts by weight of alcohol, and 200 parts by weight of balls of silicon nitride were placed in a polyethylene pot of 2 liters. They were then ground by a ball mill for seven days, thereby preparing a composite powder.

The composite powder thus obtained was measured by way of X-ray diffraction to determine crystalline phases of α-type silicon nitride and β-type silicon nitride, and the content of α-type silicon nitride in all silicon nitride was determined according to the following equation:

Content of α-type silicon nitride (%)=100×total diffraction strength of (102) and (210) faces (α-type silicon nitride) /((total diffraction strength of (102) and (210) faces (α-type silicon nitride)+total diffraction strength of (102) and (210) faces (β-type silicon nitride)). The results are given in Table 6 later on.

TABLE 3

| Powder composition | Weight (g) | Ratio (% by weight) |
| --- | --- | --- |
| Si powder | 270.7 | 69.9 |
| C powder | 43.7 | 11.3 |
| Si$_3$N$_4$ powder | 14.9 | 3.9 |
| SiC powder | 7.7 | 2.0 |
| Y$_2$O$_3$ powder | 35.0 | 9.0 |
| AlN powder | 15.0 | 3.9 |

(2) Production of sintered composite body

The composite powder produced in the above step (1) was preliminarily molded into a shape having a size of 55×35×66 mm, after which the molded body was subjected to an isotropic pressure of 4 t/cm$^2$ by cold isostatic pressing (CIP). Then, the molded body was sintered at a maximum temperature of 1850° C. under a maximum nitrogen gas pressure of 1000 kgf/cm$^2$ by HIP, thus producing a sintered composite body of silicon nitride and silicon carbide. A microscopic observation of the structure of the sintered body indicated that the sintered body had a nanocomposite structure.

(3) Properties of sintered composite body

The density of the sintered composite body was measured by the Archimedean method. The sintered composite body was cut off into a test piece having a size of 3 mm×4 mm×40 mm according to Japanese Industrial Standards (JIS) R-1601, and the test piece was subjected to a three-point bending strength test (at a room temperature and 1400° C.) and measured for a fracture toughness value Kic under the following conditions:

(1) The three-point bending strength test: At a room temperature, the test was conducted with a span of 30 mm at a crosshead speed of 0.5 mm/minute. For the test at 1400° C., the temperature of the test piece was increased to 1400° C. and kept at 1400° C. for one hour, after which the test was conducted under the above conditions.

(2) The fracture toughness value: Measured according to the SENB (Single Edge Notched Beam) method.

The results of the three-point bending strength test and the fracture toughness value are shown in Table 6.

Inventive Example 5

The composite powder of silicon nitride and silicon carbide obtained according to Inventive Example 4 was molded under the same conditions as with Inventive Example 4, subjected to HIP under the same conditions as with Inventive Example 4, and thereafter sintered at 1500° C. under a normal pressure in a nitrogen gas atmosphere for two hours, thereby producing a sintered composite body. The sintered composite body was tested for its strength and fracture toughness value Kic in the same manner as with Inventive Example 4. The results are given in Table 6.

Inventive Example 6

(1) Production of composite powder

A silicon powder having an average particle diameter of 0.5 μm, an acetylene black powder, as a carbonaceous powder, having an average particle diameter of 500 Å, a silicon nitride powder having an average particle diameter of 0.1 μm, a silicon carbide powder having an average particle diameter of 0.2 μm, and an yttrium oxide powder having an average particle diameter of 1.4 μm were weighed at proportions shown in Table 4 below such that they would have a total weight of 500 g when the reaction would progress 100%, and mixed together with 80 parts by weight of balls for 18 hours by a ball mill using a solvent of 200 parts by weight of ethanol. The mixture was then dried.

TABLE 4

| Powder composition | Weight (g) | Ratio (% by weight) |
| --- | --- | --- |
| Si powder | 274.9 | 72.9 |
| C powder | 39.4 | 10.4 |
| Si$_3$N$_4$ powder | 16.1 | 4.3 |
| SiC powder | 6.9 | 1.8 |
| Y$_2$O$_3$ powder | 40.0 | 10.6 |

The material powder thus obtained was then placed in a reaction container. After the temperature of the material powder was increased up to 1380° C. at a rate of 0.5° C./minute from 1300° C., the material powder was not kept at 1380° C. and the treatment was finished. Then, the material powder was nitrided and carbonized in a nitrogen gas atmosphere under a pressure of 9 kgf/cm$^2$, after which the material powder, 200 parts by weight of alcohol, and 200 parts by weight of balls of silicon nitride were placed in a polyethylene pot of 2 liters. They were then ground by a ball mill for seven days, thereby preparing a composite powder. The content of α-type silicon nitride in the obtained composite powder was determined in the same manner as with Inventive Example 4. The result is shown in Table 6.

(2) Production of sintered composite body

The composite powder produced in the above step (1) was filled in a hot-pressing graphite die assembly having a diameter of 42 mm, and the temperature thereof was increased up to 1850° C. under a load of 4.8 t for hot pressing sintering in a nitrogen gas atmosphere under 9 kgf/cm$^2$, thereby producing a sintered composite body of silicon nitride and silicon carbide. A microscopic observation of the structure of the sintered body indicated that the sintered body had a nanocomposite structure. The obtained sintered composite body was measured for its properties in the same manner as with Inventive Example 4, and the results are shown in Table 6.

Inventive Example 7

A composite powder of silicon nitride and silicon carbide and a sintered composite body of silicon nitride and silicon carbide were produced in the same manner as with Inventive Example 6 except that a silicon powder having an average particle diameter of 3.4 μm was used. The content of α-type silicon nitride in the produced composite powder was determined in the same manner as with Inventive Example 4. The result is given in Table 6.

Comparative Example 4

Using the same material powders as with Inventive Example 4, a material powder was produced, and nitrided and carbonized under the same heating condition and nitrogen atmosphere as with Inventive Example 4 except that the temperature was increased at a rate of 2° C./minute from 1300° C. After the material powder was heat-treated, it was ground by a ball mill for seven days in the same manner as with Inventive Example 4, thus preparing a composite powder.

The produced composite powder of silicon nitride and silicon carbide was molded under the same conditions as with Inventive Example 4, and the molded body was subjected to HIP sintering under the same conditions as with Inventive Example 4, thus producing a sintered composite body. The sintered composite body was then tested for its strength and fracture toughness value Kic in the same manner as with Inventive Example 4. The results are shown in Table 6.

Comparative Example 5

Using the same material powders as with Inventive Example 4 except that an acetylene black powder was used as a carbonaceous powder, a material powder was produced, and nitrided and carbonized under the same heating condition as with Inventive Example 4. After the material powder was heat-treated, it was ground by a ball mill for seven days in the same manner as with Inventive Example 4, thus preparing a composite powder.

The produced composite powder of silicon nitride and silicon carbide was molded under the same conditions as with Inventive Example 4, and the molded body was subjected to HIP sintering under the same conditions as with Inventive Example 4, thus producing a sintered composite body. The sintered composite body was then tested for its strength and fracture toughness value Kic in the same manner as with Inventive Example 4. The results are shown in Table 6.

Comparative Example 6

The composite powder of silicon nitride and silicon carbide produced according to Comparative Example 5 was molded under the same conditions as with Inventive Example 4, and the molded body was subjected to HIP sintering under the same conditions as with Inventive Example 4, and then sintered under a normal pressure under the same conditions as with Inventive Example 4, thus producing a sintered composite body. The sintered composite body was then tested for its strength and fracture toughness value Kic in the same manner as with Inventive Example 4. The results are shown in Table 6.

Comparative Example 7

The same powders as with Inventive Example 4 except that no yttrium oxide powder and no aluminum nitride powder were added were weighed at proportions indicated in Table 5 below, and mixed by a ball mill under the same conditions as with Inventive Example 4. The mixture was then dried.

TABLE 5

| Powder composition | Weight (g) | Ratio (% by weight) |
|---|---|---|
| Si powder | 298.8 | 81.5 |
| C powder | 42.8 | 11.7 |
| $Si_3N_4$ powder | 17.5 | 4.8 |
| SiC powder | 7.5 | 2.0 |

The material powder thus obtained was then placed in a reaction container, and then nitrided and carbonized under the same conditions as with Inventive Example 4. 90% by weight of the composite powder after being heat-treated, 7% by weight of an yttrium oxide powder having an average particle diameter of 1.4 μm, 3% by weight of aluminum nitride having an average particle diameter of 2 μm, 200% by weight of alcohol, and 200% by weight of balls of silicon nitride were placed in a polyethylene pot of 2 liters. They were then ground by a ball mill for seven days, thereby preparing a composite powder having the same composition as Inventive Example 4. The content of α-type silicon nitride in the obtained composite powder was determined in the same manner as with Inventive Example 4. The result is shown in Table 6.

The produced composite powder of silicon nitride and silicon carbide was molded under the same conditions as with Inventive Example 4, and the molded body was subjected to HIP sintering under the same conditions as with Inventive Example 4, thus producing a sintered composite body of silicon nitride and silicon carbide. The sintered composite body was then tested for its strength and fracture toughness value Kic, and the results are shown in Table 6.

TABLE 6

| | Content of α-type silicon nitride | Three-point bending strength (MPa) | | Fracture toughness value |
|---|---|---|---|---|
| | (%)[1] | Room temp. | 1400° C. | (Mpa · $m^{1/2}$) |
| In. Ex. 4 | 42.5 | 960.5 | 518.5 | 8.05 |
| In. Ex. 5 | 42.5 | 702.9 | 495.4 | — |
| In. Ex. 6 | 32.3 | 1038.2 | 727.3 | — |
| In. Ex. 7 | 42.3 | 1084.2 | 830.3 | — |
| Co. Ex. 4 | 20.8 | 552.5 | 293.1 | 7.03 |
| Co. Ex. 5 | 24.4 | 572.1 | 412.5 | 7.88 |
| Co. Ex. 6 | 24.4 | 470.8 | 181.1 | 5.09 |
| Co. Ex. 7 | 5.3 | 397.4 | 208.2 | — |

[1]Content of α-type silicon nitride (%) = 100 × total diffraction strength of (102) and (210) faces (α-type silicon nitride)/((total diffraction strength of (102) and (210) faces (α-type silicon nitride) + total diffraction strength of (102) and (210) faces (β-type silicone nitride)).

The composite powders according to Comparative Examples 4 and 5 wherein the rate at which the temperature was increased in the nitriding and carbonizing reactions was greater than 0.5° C./minute had a much lower content of α-type silicon nitride than those according to Inventive Examples 4, 6, and 7. The content of α-type silicon nitride in the composite powder according to Comparative Example 7 was much smaller than that in the composite powder according to Inventive Example 4 because it contained no sintering additive in the nitriding and carbonizing reactions.

Figure 3:
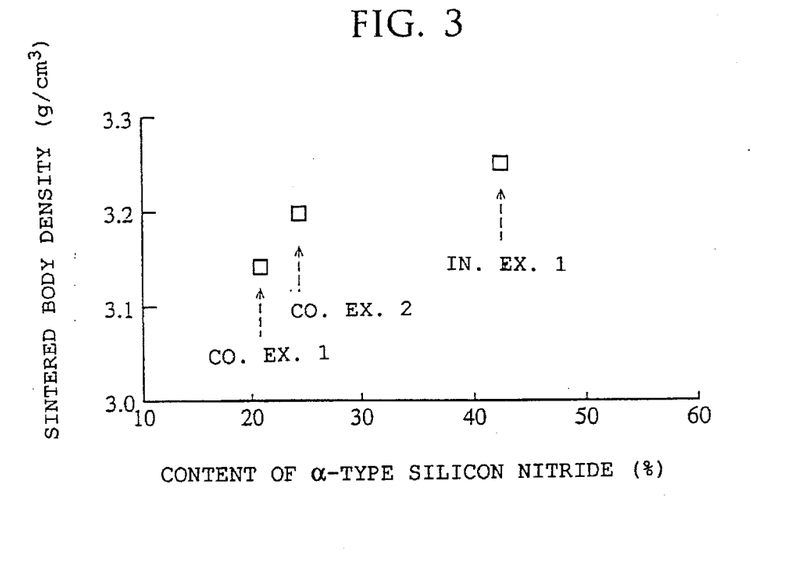
FIG. 3 is a graph showing the relationship between the sintering densities and contents of α-type silicon nitride of sintered composite bodies according to Inventive Example 4 and Comparative Examples 4 and 5.
Figure 4:
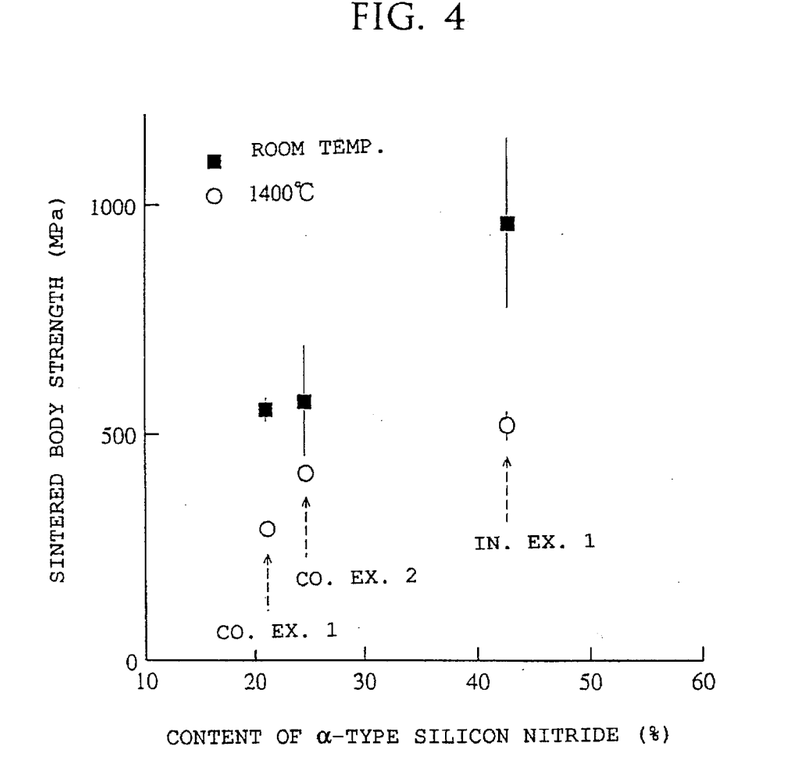
FIG. 4 is a graph showing the relationship between the bending strengths and contents of α-type silicon nitride of sintered composite bodies according to inventive Example 4 and Comparative Examples 4 and 5.

FIG. 3 shows the relationship between the sintering densities and contents of α-type silicon nitride based on the data of the sintered composite bodies according to Inventive Example 4 and Comparative Examples 4 and 5. FIG. 4 shows the relationship between the bending strengths and contents of α-type silicon nitride based on the data of the sintered composite bodies according to Inventive Example 4 and Comparative Examples 4 and 5. FIGS. 3 and 4 indicate that the sintered bodies according to Comparative Examples 4–7 had no sufficient mechanical strength as compared with the sintered bodies according to Inventive Examples 4–7.

As described above, according to the second embodiment, since a mixture of a silicon powder and a carbonate powder is used as starting materials, and silicon is simultaneously nitrided and carbonized by heat treatment in an atmosphere containing a nitrogen gas and a particular rate at which the temperature increases, a resulting composite powder has a high content of α-type silicon nitride. A sintered composite body produced from the composite body has excellent high-temperature strength, static fatigue resistance, wear resistance, and hardness. The sintered composite body of silicon nitride and silicon carbide is suitable for use as a structural member or the like that is used at high temperatures.

Although certain preferred embodiments of the present invention has been shown and described in detail, it should be understood that various changes and modifications may be made therein without departing from the scope of the appended claims.

What is claimed is:

1. A method of manufacturing a sintered composite body of silicon nitride and silicon carbide, comprising the steps of:

mixing a silicon powder with a carbonaceous powder and a sintering additive, to produce a mixture;

molding said mixture into a molded body;

heat-treating said molded body in an atmosphere containing a nitrogen gas for thereby simultaneously nitriding and carbonizing silicon contained in said molded body; and subsequently firing the heat treated molded body in a nitrogen gas atmosphere.

2. A method according to claim 1, wherein said molded body is heat-treated at a temperature of at most 1450° C.

3. A method according to claim 2, wherein said molded body is heat-treated at a temperature ranging from 1350° to 1400° C.

4. A method according to claim 1, wherein said molded body is fired at a temperature ranging from 1700° C. to 2200° C.

5. A method according to claim 4, wherein said molded body is fired at a temperature ranging from 1800° C. to 2000° C.

6. A method of manufacturing a sintered composite body of silicon nitride and silicon carbide, comprising the step of:

firing a composite powder of silicon nitride and silicon carbide by way of hot isostatic pressing or hot die pressing;

wherein said composite powder is a composite powder of silicon nitride and silicon carbide produced by mixing a silicon powder with a carbonaceous powder and a sintering additive, to produce a mixture, molding said mixture into a molded body, and heat-treating said molded body in an atmosphere containing a nitrogen gas for thereby simultaneously nitriding and carbonizing silicon contained in said molded body, said composite powder having a content of α-type silicon nitride which is at least 30% of all silicon nitride in the composite powder.

* * * * *